United States Patent
Gupta et al.

(10) Patent No.: US 8,301,338 B2
(45) Date of Patent: Oct. 30, 2012

(54) SPEED CONSTRAINT CONTROL PROCEDURE

(75) Inventors: Pinaki Gupta, Wixom, MI (US); Lawrence A. Kaminsky, White Lake, MI (US); Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/024,454

(22) Filed: Feb. 10, 2011

(65) Prior Publication Data

US 2012/0065838 A1 Mar. 15, 2012

Related U.S. Application Data

(60) Provisional application No. 61/383,047, filed on Sep. 15, 2010.

(51) Int. Cl.
*G06F 7/00* (2006.01)

(52) U.S. Cl. ......................................................... 701/36

(58) Field of Classification Search ................. 701/36, 701/51, 70, 99; 180/170, 65.265, 65.27, 180/65.275, 65.28, 65.285; 477/2
See application file for complete search history.

(56) References Cited

U.S. PATENT DOCUMENTS 7,096,105 B2 * 8/2006 Ho et al. ........................... 701/50
8,073,602 B2 * 12/2011 Hsieh et al. ..................... 701/54

* cited by examiner

*Primary Examiner* — James Trammell
*Assistant Examiner* — Michael D Lang
(74) *Attorney, Agent, or Firm* — Quinn Law Group, PLLC

(57) ABSTRACT

A method includes receiving speed constraints associated with two independent vehicle components and receiving speed constraints associated with a first dependent vehicle component and a second dependent vehicle component. The method further includes defining a relationship between the received speed constraints of the independent vehicle components and the first and second dependent vehicle components. Moreover, speed values of an unknown speed constraint associated with a third dependent component are derived based on the defined relationship between the received speed constraints of the independent vehicle components and the first and second dependent vehicle components.

20 Claims, 3 Drawing Sheets

SPEED CONSTRAINT CONTROL PROCEDURE

CROSS-REFERENCE TO RELATED APPLICATIONS

This application claims the benefit of U.S. Provisional Patent Application No. 61/383,047, filed Sep. 15, 2010, which is hereby incorporated by reference in its entirety.

TECHNICAL FIELD

The invention relates to a procedure for speed constraint control.

BACKGROUND

Passenger and commercial vehicles include sophisticated vehicle powertrain systems. That is, the powertrain generally includes an engine, transmission, clutches, etc. that work together to propel the vehicle. Hybrid vehicles introduce even more complexity into the powertrain system. In particular, the powertrain system of a hybrid vehicle may include one or more electric motors.

Each of these components in the powertrain system has operating constraints. For example, the engine and transmission may each be configured to operate at a certain range of speeds, and those ranges of speeds may be different. Operating a powertrain component outside of its operating constraint may cause the component to operate below its ideal capacity or possibly cause the component to fail. This may lead to an unpleasant driving experience for a driver of the vehicle.

SUMMARY

A method includes receiving speed constraints associated with two independent vehicle components, receiving speed constraints associated with a first dependent vehicle component, and receiving speed constraints associated with a second dependent vehicle component. The method further includes defining a relationship between the received speed constraints of the independent vehicle components and the first and second dependent vehicle components. Moreover, the method includes deriving, via a computing device, speed values of an unknown speed constraint associated with a third dependent component based on the defined relationship between the received speed constraints of the independent vehicle components and the first and second dependent vehicle components.

A vehicle includes a plurality of independent vehicle components configured to rotate. A first dependent vehicle component is operably connected to at least one of the independent vehicle components and configured to rotate at a speed dependent upon the rotation of at least one of the independent vehicle components. A second dependent vehicle component is operably connected to at least one of the independent vehicle component and configured to rotate at a speed dependent upon the rotation of at least one of the independent vehicle components. The independent vehicle components, the first dependent vehicle component, and the second dependent vehicle component are each associated with a speed constraint. A third dependent vehicle component is operably connected to at least one of the independent vehicle components and configured to rotate at a speed dependent upon the rotation of at least one of the independent vehicle components. The third dependent vehicle component is associated with an unknown speed constraint. A control processor is configured to define a relationship between the speed constraints of the independent vehicle components, the first dependent vehicle component, and the second dependent vehicle component, and derive speed values within the unknown speed constraint of the third dependent vehicle component based on the derived relationship between the speed constraints of the independent vehicle components and the first and second dependent vehicle components.

The system and method provided herein can be used to, for instance, determine speed values that satisfy the speed constraints of multiple components within the system, including a situation where the speed constraints of one system component are unknown.

The above features and advantages and other features and advantages of the present invention are readily apparent from the following detailed description of the best modes for carrying out the invention when taken in connection with the accompanying drawings.

DETAILED DESCRIPTION

A system and method is provided that can be used to determine speed values that satisfy the speed constraints of multiple components in a vehicle, and in particular, unknown speed constraints of a system component. An example system includes multiple vehicle components configured to operate at speeds within multiple speed constraints. Each vehicle component is associated with a speed constraint. The system includes independent and dependent components. In one particular implementation, the speeds of the dependent components depend upon the speeds of the independent components. The system, however, may not know the speed constraints for one of the dependent components. Accordingly, a control processor is configured to define a relationship between the known speed constraints, and derive the speed values within the unknown speed constraint based on the defined relationship between the known speed constraints.

Figure 1:
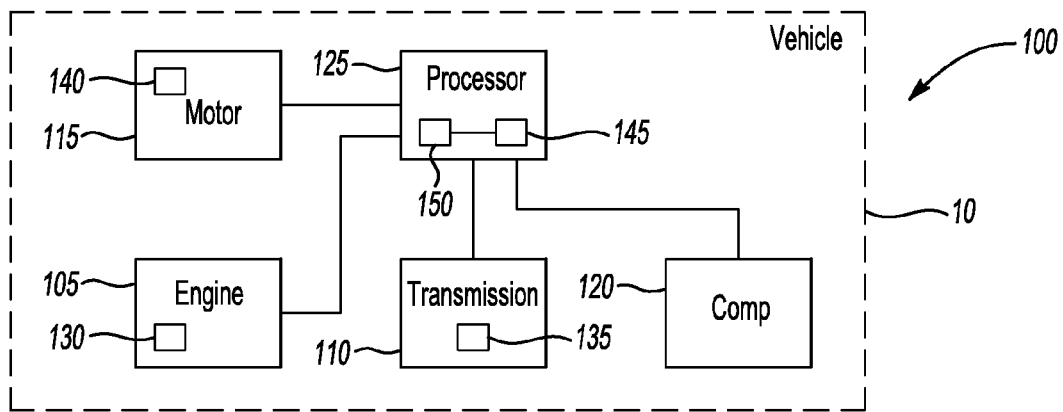
FIG. 1 is a schematic diagram of a vehicle having a control processor.

FIG. 1 illustrates a vehicle 10 that includes a system 100 that is able to derive speed values that satisfy at least two speed constraints in a vehicle. The system 100 may take many different forms and include multiple and/or alternate components and facilities. While a system 100 is shown in the Figures, the components illustrated in the Figures are not intended to be limiting. Indeed, additional or alternative components and/or implementations may be used.

The system 100 as illustrated includes an engine 105, a transmission 110, a motor and/or generator 115, and other vehicle components 120 in communication with a control processor 125. The system 100 may be implemented in the vehicle 10, which may include a passenger or commercial automobile. Further, the system 100 may be implemented in a hybrid electric vehicle including a plug-in hybrid electric vehicle (PHEV) or an extended range electric vehicle (EREV), a gas-powered vehicle, a battery electric vehicle (BEV), or the like.

The engine 105 may include any device configured to generate motion from an energy source. For example, the engine 105 may include an internal combustion engine 105 that burns a fossil fuel and air mixture to generate angular motion. The motion generated by the engine 105 may be output as a torque via a shaft (not shown). The engine 105 may be configured to drive the shaft at different rotational speeds based on, for example, the fuel to air ratio in the engine 105 at any given time.

An engine control unit 130 may be used to control the operation of the engine 105. The engine control unit 130 may be configured to store an engine speed constraint that identifies a range of angular speeds at which the engine 105 optimally performs. The engine speed constraint may be provided by an engine manufacturer or determined via testing. Of course, different engines may have different engine speed constraints. Moreover, the engine control unit 130 may operate the engine 105 at rotational speeds that are outside the engine speed constraints. However, the engine 105 may not perform as well when operated at those speeds.

The transmission 110 may include any device configured to convert the torque generated by the engine 105 into rotational motion that is output to the wheels of the vehicle. For instance, the transmission 110 may include a plurality of gears having various ratios. The gears may be configured to convert the torque provided from the engine 105 to a torque provided to the wheels of the vehicle 10. That is, the gears may be configured to convert the rotational speed of the engine 105 into other rotational speeds that are provided to an output shaft that drives the wheels of the vehicle 10. The rotational speed output by the engine 105 need not be the rotational speed of the output shaft of the transmission 110. This way, the wheels of the vehicle may rotate at a different speed than the engine 105. The operation of the transmission 110 may be controlled by a transmission control unit 135 that may store information about the operating parameters of the transmission 110.

The motor and/or generator 115 may include any device that converts electrical energy into motion, such as rotational motion. The system 100 may include any number of motors and/or generators 115. In one particular approach, the system 100 includes two motors 115 that may be powered by a battery (not shown). Additionally, one of the motors 115 may further be powered by the engine 105, which can then generate the electricity necessary to power the other motor or generator 115 in order to provide a tractive effort when, for instance, the battery has discharged or is otherwise unable to power the motor 115. Thus, the motor 115 may provide a torque to the transmission 110 in addition to or as an alternative to the engine 105. For simplicity and ease of understanding, the following discussion details implementations using a motor 115, while similar examples may be provided using a generator instead of or in addition to the motor 115.

The motor 115 may be configured to operate within a particular range of motor speeds. As such, a motor control unit 140 may be used to control the motor 115. The motor control unit 140 may store a motor speed constraint that identifies a range of angular speeds at which the motor 115 is configured to perform. If the system 100 includes multiple motors 115, each motor 115 may have an associated motor control unit 140 and/or motor speed constraint. Each motor 115 may be controlled by the same or a different motor control unit 140, and each motor 115 in the system 100 may have the same or different speed constraints than the other motors 115 in the system 100.

The system 100 may include other vehicle components 120 that are configured to operate within predefined constraints, including rotational speed constraints. These other vehicle components 120 may include any component used in a vehicle that is associated with a speed, such as a rotational speed. For instance, the other vehicle components 120 may include a clutch assembly, a brake assembly, or a pinion gear. The speed constraints of the other vehicle components 120 may be stored in a control unit (not shown), and may be provided by a manufacturer of the vehicle component or determined via testing. Of course, the other vehicle components 120 may be operated outside of the predefined constraints, but the performance of these other vehicle components 120 may diminish under such circumstances.

The various system components described above may be configured to interface with each other when used in, for instance, a vehicle 10. In one particular implementation, the engine 105 may provide a torque to an input shaft of the transmission 110 via a clutch assembly. In another particular implementation, such as in an extended range electric vehicle, the engine 105 may provide a torque to a generator that may be used to drive one of the motors 115 that, in turn, provides a torque to the transmission 110. The other vehicle components 120 may be included in the transmission 110, and as such, the speeds of the other vehicle components 120 may depend upon the rotational speed of the motor 115. Accordingly, the speed constraints of one component (e.g., the motor 115) may be relevant to the operation of other components (e.g., the other vehicle components 120). Problems, however, may arise if an independent component such as the motor 115 drives a dependent component such as the other vehicle components 120 outside of the dependent component's speed constraints.

The control processor 125 may include any device configured to monitor the speed constraints of independent and dependent components in the system 100 and derive the speed values of an unknown speed constraint for another dependent component that satisfy the speed constraints of the independent and other dependent components in the system 100. This way, the control processor 125 may reduce the likelihood that the independent component will drive the dependent component beyond its speed constraints. In one particular approach, the control processor 125 is configured to derive speed range that satisfies the speed constraints of all of the vehicle components. The control processor 125 may output the derived speed values to the engine control unit 130, the transmission control unit 135, and the motor control unit 140 so that the engine 105, transmission 110, and motor 115 may be controlled within the speed constraints of all of the vehicle components 120. As illustrated, the control processor 125 includes a memory device 145 and a processing module 150.

Figure 2:
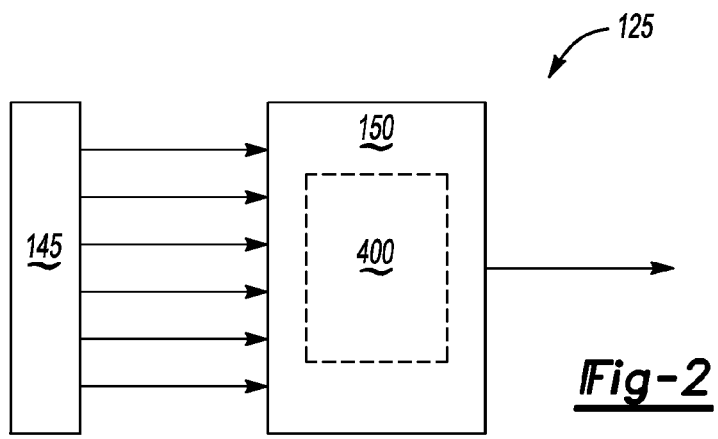
FIG. 2 is a schematic diagram of the control processor of FIG. 1.

Referring now to FIG. 2, the memory device 145 may include any volatile or non-volatile data storage medium. The memory device 145 may be configured to receive information from, for instance, the engine control unit 130, the transmission control unit 135, the motor control unit 140, and the like. In one particular implementation, the memory device 145 may be configured to receive and store the speed constraints associated with the engine 105, transmission 110, motors 115, and/or any other vehicle components 120. The memory device 145 may be further configured to receive and store additional information about the components of the system 100. This additional information may include calibration parameters that may be used to project, for instance, the speed values of the dependent components onto the speed values of the independent component, as discussed in greater detail below with respect to FIG. 3.

The processing module 150 is configured to receive the information stored in the memory device 145. For example, the processing module 150 may receive the speed constraints stored by the engine control unit 130, the transmission control unit 135, and the motor control unit 140, as well as any other speed constraints for other vehicle components 120 via a communication bus (not shown). The processing module 150 may further receive the calibration parameters from the memory module. The processing module 150 may be further configured to define a relationship between the known speed constraints of the independent and dependent components in the vehicle 10, and derive the speed values of an unknown speed constraint associated with another dependent component based on that defined relationship.

For example, the processing module 150 may be configured to identify minimum and maximum speed values of the speed constraint associated with the independent component. For instance, the processing module 150 may be configured to define the minimum and maximum speed values of the motor 115. The processing module 150 may be further configured to a common speed value. That is, the processing module 150 may be configured to identify one or more speed values that are within the speed constraints of the dependent components. As discussed above, the dependent components may include a clutch assembly, brake assembly, output shaft of the engine 105 or transmission 110, a pinion gear, etc. Additionally, the processing module 150 may be configured to determine whether the common speed value is within the first speed constraint. If so, the processing module 150 may be configured to include the common speed value in the unknown speed constraint. If not, the processing module 150 may be configured to exclude the common speed value from the unknown speed constraint. The processing module 150 may repeat this until the unknown speed constraint is fully derived.

In one particular approach, the processing module 150 may be configured to identify a minimum speed value and a maximum speed value of the unknown speed constraint. For instance, the processing module 150 may be configured to identify the smallest speed values of the independent and dependent components, and the smallest speed value that is within the speed constraints all of the independent and dependent components may represent the minimum speed value of the unknown speed constraint. Similarly, the processing module 150 may be configured to identify the largest speed values of the independent and dependent components. The largest speed value that is within the speed constraints all of the independent and dependent components may represent the maximum speed value of the unknown speed constraint.

As discussed above, the processing module 150 may be configured to define a relationship between the operating parameters (e.g., the speed constraints) of the independent and dependent components. For instance, the processing module 150 may receive and consider information about independent and dependent components in the system 100. The processing module 150 may consider the calibration parameters, which may be used to project the speed values of one vehicle component onto the speed values of another vehicle component. That is, the calibration parameters of the independent and dependent components may be used to define a geometric model of the independent and system components. An example geographic model is illustrated in FIG. 3.

The processing module 150 may be further configured to prioritize the speed constraints. For example, the processing module 150 may be configured to prioritize the speed constraints of the independent component higher than the speed constraints of the dependent components. Therefore, the processing module 150 will ensure that the speed constraints of the independent component is satisfied when deriving the unknown speed constraints of one of the dependent components, even if the speed constraints of one or more other dependent components cannot be satisfied. The processing module 150 may further prioritize the speed constraints of the dependent components if, for instance, the speed constraints of each dependent component cannot be satisfied. In this way, the processing module 150 may find a suboptimal operating region if all of the speed constraints of the independent and dependent components cannot be satisfied simultaneously.

Figure 3:
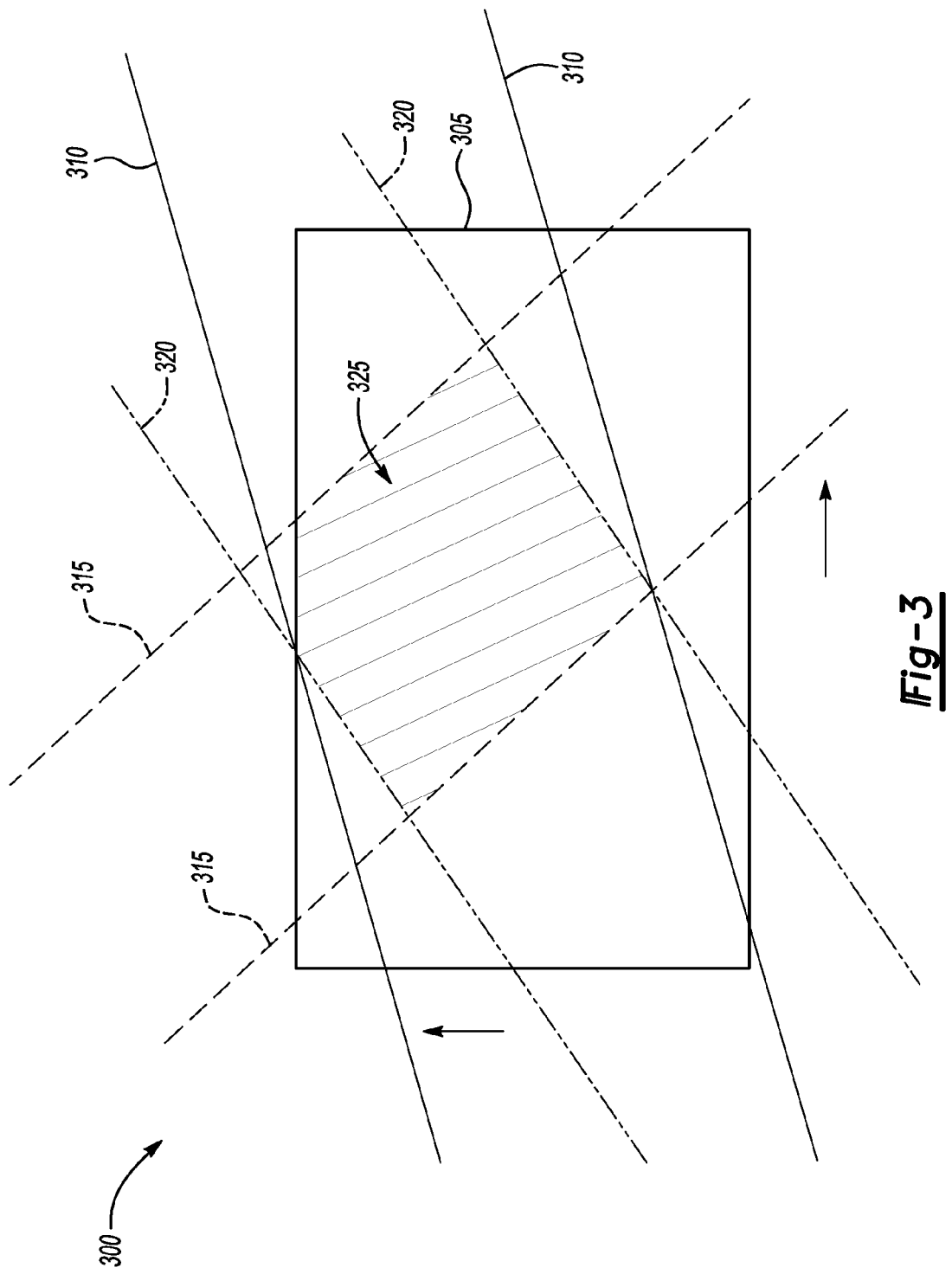
FIG. 3 is a graph illustrating example speed constraints and speed values that satisfy the speed constraints as recognized by the control processor FIG. 2.

FIG. 3 is a graph 300 illustrating example speed constraints of a derived component given the speed constraints of two dependent components projected onto the speed constraints of multiple independent components.

As illustrated, the lines of the graph 300 represent ranges of angular speeds for various components of the system 100. For instance, the graph 300 includes the speed constraints 305 of the independent components, the unknown speed constraints 310 of a dependent component, and known speed constraints 315 and 320 of other dependent components. The shaded region 325 represents speed values that satisfy the speed constraints of each of the independent and dependent components.

In FIG. 3, the speed constraints 305 of the independent components (e.g., the motors and/or generators 115) are illustrated as a rectangle. However, this is merely an example since the speed constraints 305 of the independent variable may be represented as another geometric shape besides a rectangle. As discussed above, the speed constraints 305 of the independent variable may be given a higher priority over the speed constraints 315, 320 of the dependent components. In one particular approach, the speed constraints for each component in the system 100 include at least one speed value within the speed constraints 305 of the independent components so that the independent components can drive the dependent components.

The unknown speed constraint 310 for one of the dependent system components may be derived from the speed constraints 305 and the speed constraints 315 and 320 of the other dependent components. In one particular approach, the unknown speed constraints 310 may have a slope relative to an axis defined by the speed constraints 305 of the independent components.

The speed constraint 315 and/or the speed constraint 320 may be associated with the same or different dependent components than is associated with the unknown speed constraint 310 (e.g., a different degree of freedom of that same dependent component). Like the unknown speed constraint 310, the slopes of the speed constraints 315 and 320 may be defined by the calibration parameters stored in the memory device 145 for the dependent components associated with those speed constraints. As discussed above, the calibration parameters may be used to project the speed constraints of the dependent components onto an axis defined by the speed constraints of the independent components. Accordingly, in the approach illustrated, the speed constraint 315 has a negative slope relative to the speed constraints 305, while the unknown speed constraint 310 and the speed constraint 320 each have a positive slope relative to the speed constraints 305.

In the graph 300 of FIG. 3, the speed constraints 310, 315, and 320 are each defined by parallel lines. However, one or more of these speed constraints 310, 315, and 320 may be defined by a single line instead of two parallel lines. A single line representing a speed constraint indicates that the dependent component operates at the values on that line. That is, the single line represents a relationship between the speed constraints of the dependent component as a function of the speed constraints of the independent component. Two lines representing a speed constraint indicate an approximate range of speeds within which the dependent component can operate.

The processing module 150 may derive the speed values of the unknown speed constraint 310 using the speed constraints 315, 320 of the dependent components and the speed constraints 305 of the independent components. That is, the processing module 150 may determine the minimum and maximum speed values of the unknown speed constraint 310 using points of intersection between the speed constraints 315, 320 and the operating parameters 305. In one particular implementation, the processing module 150 may define geometric relationships between the unknown speed constraint 310 and the dependent constraints 315, 320 and the independent speed constraints 305. The processing module 150 may identify common speed values within the speed constraints 315 and 320, and compare those common speed values to the speed constraints 305 to define the shaded region 325. The minimum speed value in the shaded region 325 may represent one possible minimum speed value of the unknown speed constraint 310, while the maximum speed value in the shaded region 325 may represent one possible maximum speed value of the unknown speed constraint 310. As illustrated, the unknown speed constraint 310 is derived from two parallel lines passing through the extremes (e.g., maximum speed and minimum speed) represented by the shaded region 325.

The processing module 150 may use any of the procedures discussed below with respect to FIGS. 4-6, or any other procedure, to derive the speed values of the unknown speed constraint.

In general, computing systems and/or devices, such as the processing module 150, the engine control unit 130, the transmission control unit 135, and the motor control unit 140, may employ any of a number of computer operating systems and generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 4:
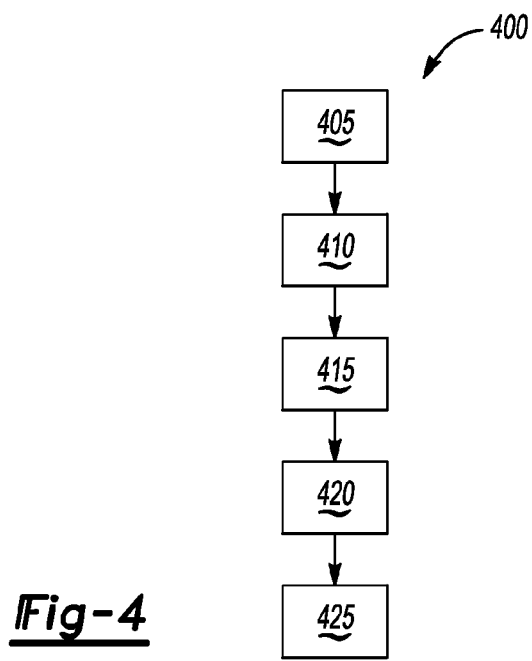
FIG. 4 illustrates a flowchart of a process that may be implemented by the control processor of FIG. 2.

FIG. 4 illustrates a process 400 that may be implemented by the system 100. For instance, the process 400 may be implemented by the control processor 125.

At block 405, the system 100 may receive speed constraints associated with at least two independent vehicle components. For instance, the control processor 125 may receive the speed constraints associated with the engine 105, the transmission 110, and/or the motor 115 from the engine control unit 130, the transmission control unit 135, and/or the motor control unit 140. The speed constraints may be stored in the memory device 145 upon receipt by the control processor 125.

At block 410, the system 100 may receive speed constraints associated with a first dependent vehicle component. That is, the control processor 125 may receive speed constraints associated with an output shaft of the engine 105 or transmission 110, a clutch assembly, a brake assembly, a pinion gear, etc. and store the received speed constraints in the memory device 145.

At block 415, the system 100 may receive speed constraints associated with a second dependent vehicle component. As with the speed constraints associated with the first dependent vehicle component, the control processor 125 may receive speed constraints associated with an output shaft of the engine 105 or transmission 110, a clutch assembly, a brake assembly, a pinion gear, etc. and store the received speed constraints in the memory device 145.

At block 420, the system 100 may define a relationship between the speed constraints of the independent and dependent vehicle components. In one particular approach, the control processor 125 may define a geometric relationship between the independent and dependent components. That is, the control processor 125 may identify equations that define the speed constraints of the dependent components relative to the speed constraints of the independent components. The control processor 125 may use, for instance, the calibration parameters to define a slope of the speed constraints of the dependent components relative to speed constraints of the independent components.

At block 425, the system 100 may derive speed values of the unknown speed constraint of a third dependent vehicle component based on the speed constraints of the independent and dependent vehicle components. For instance, the control processor 125 may derive the unknown speed constraints using the geometric relationship between the speed constraints of the independent and dependent components.

Figure 5:
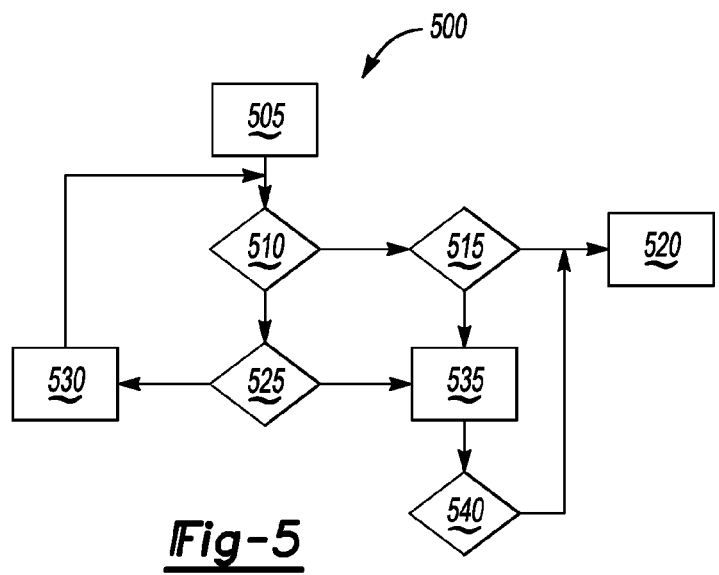
FIG. 5 illustrates a flowchart of a process of deriving a minimum speed value in an unknown speed constraint that may be implemented by the control processor of FIG. 2.

FIG. 5 illustrates an exemplary process 500 for deriving a minimum speed value of a dependent component based on the known speed constraints of the independent and other dependent components. The exemplary process 500 of FIG. 5 may be implemented by the control processor 125, for example.

At block 505, the control processor 125 may select an initial minimum speed value of the unknown speed constraint based on the independent vehicle components. One way for the control processor 125 to select the minimum speed value at block 505 is to select the smallest value of the independent components (e.g., the bottom right corner of the box defined by the speed constraints 305 in FIG. 3). The control processor 125 may determine whether this value satisfies the speed constraints of the first dependent component (e.g., lines 315 of FIG. 3). If so, the control processor 125 may use that value as the first potential minimum speed value. If not, the control processor 125 may look at the intersection of the line representing the speed constraint 315 that is closest to the initial value (e.g., the lower right corner of the box 305). As illustrated in FIG. 3, the lower right corner of box 305 does meet the speed constraints of the first dependent component. And thus, the first potential minimum speed value is represented by the lower right corner of box 305. The control processor 125 may repeat this for the second dependent component. That is, the control processor 125 may determine whether the initial value satisfies the speed constraints of the second dependent component (e.g., lines 320 of FIG. 3). As illustrated in FIG. 3, the lower right corner of box 305 does not meet the speed constraints of the second dependent component. Thus, the second potential minimum speed value is represented by the intersection of the line representing the speed constraint 320 that is closest to the initial value (e.g. the lower right corner of the box 305). The control processor 125 may determine whether the first or second potential minimum speed value is smaller, and use that as the selected minimum speed value as selected at block 505.

At block 510, the control processor 125 may determine whether the minimum speed value identified at block 505 is within the speed constraints of the first dependent component. If so, the process 500 may continue at block 515. If not, the process may continue at block 525.

At block 515, the control processor 125 may determine whether the minimum speed value identified at block 505 is within the speed constraints of the second dependent component. If so, the process 500 may continue at block 520. If not, the process 500 may continue at block 535.

At block 520, the control processor 125 may set the minimum value selected at block 505 as the minimum value of the unknown speed constraint. As discussed above, the unknown speed constraints may be the speed constraints of another dependent component within the system.

At block 525, the control processor 125 may determine whether the minimum speed value identified at block 505 is within the speed constraints of the second dependent component. If not, the process 500 may continue at block 530. If, however, the minimum speed value identified at block 505 is within the speed constraints of the second dependent component, the process 500 may continue at block 535.

At block 530, the control processor 125 may select a new minimum speed value. For instance, the control processor 125 may choose another speed value defined by either the dependent speed constraints, the independent speed constraints, or both, as the new minimum speed value. The process 500 may continue at block 510 with the new minimum speed value.

At block 535, the control processor 125 may select another value based on the intersections of the speed constraints of the first and second dependent components. Alternatively, the control processor 125 may select another value based on the intersections of the speed constraints of either the first or second dependent components and the speed constraints of the independent components. The control processor 125 may select the intersection with the smallest value when trying to determine the minimum speed value of the unknown speed constraint. The process 500 may continue with this new value at block 540.

At block 540, the control processor 125 may determine whether the new minimum speed value (e.g., based on the intersection between the speed constraints of either the first or second dependent components and the speed constraints of the independent components) satisfies the other speed constraints. For instance, if the new minimum speed value determined at block 535 is based on the intersection between the speed constraints of the first and second dependent components, the control processor 125 may determine whether this new value satisfies the speed constraints of the independent components at block 540. If, however, the new minimum speed value determined at block 535 is based on the intersection between the speed constraints of the first dependent component and the independent components, at block 540, the control processor 125 may determine whether the minimum speed value satisfies the speed constraints of the second dependent component. If all speed constraints are satisfied, the process 500 may continue at block 520. If not all speed constraints are satisfied, the process 500 may continue at block 535, except that the control processor 125 may select the intersection with the next lowest speed value as the new minimum speed value.

Figure 6:
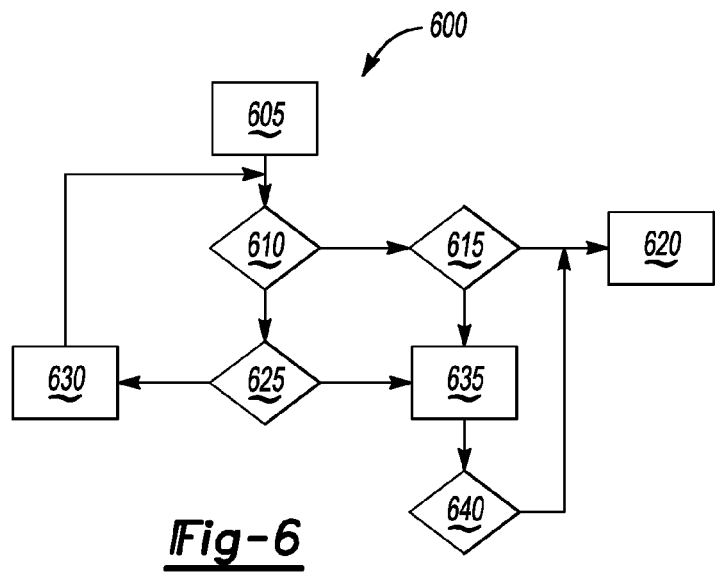
FIG. 6 illustrates a flowchart of a process of deriving a maximum speed value in an unknown speed constraint that may be implemented by the control processor of FIG. 2.

FIG. 6 illustrates an exemplary process 600 for deriving a maximum speed value of a dependent component based on the known speed constraints of the independent and other dependent components. The exemplary process 600 of FIG. 6 may be implemented by the control processor 125, for example.

At block 605, the control processor 125 may identify an initial maximum speed value of the unknown speed constraints based on the independent vehicle components. One way for the control processor 125 to select the maximum speed value at block 605 is to select the smallest value of the independent components (e.g., the top left corner of the box defined by the speed constraints 305 in FIG. 3). The control processor 125 may determine whether this value satisfies the speed constraints of the first dependent component (e.g., lines 315 of FIG. 3). As illustrated in FIG. 3, it does not. Accordingly, the control processor 125 may look at the intersection points between the box 305 and the closest line representing the speed constraint 315. The control processor 125 may identify this as a first potential maximum speed value. The control processor 125 may repeat this for the second dependent component. That is, the control processor 125 may determine whether the initial value satisfies the speed constraints of the second dependent component (e.g., lines 320 of FIG. 3). If so, the control processor 125 may use that value as the second potential maximum speed value. If not, the control processor 125 may look at the intersection between the speed constraints of the control processor 125 and the intersection of line representing the speed constraints 320 that is closest to the initial value (e.g., the top left corner of the box 305). As illustrated in FIG. 3, it also does not satisfy those speed constraints 320. Accordingly, the control processor 125 may look at the intersection points between the box 305 and the closest line representing the speed constraint 320. The control processor 125 may identify this as a first potential maximum speed value. The control processor 125 may determine whether the first or second potential maximum speed value is larger, and use that as the selected maximum speed value as selected at block 605.

At block 610, the control processor 125 may determine whether the maximum speed value identified at block 605 is within the speed constraints of the first dependent component.

If so, the process 600 may continue at block 615. If not, the process may continue at block 625.

At block 615, the control processor 125 may determine whether the maximum speed value identified at block 605 is within the speed constraints of the second dependent component. If so, the process 600 may continue at block 620. If not, the process 600 may continue at block 635.

At block 620, the control processor 125 may set the maximum value selected at block 605 as the maximum value of the unknown speed constraint. As discussed above, the unknown speed constraints may be the speed constraints of another dependent component within the system.

At block 625, the control processor 125 may determine whether the maximum speed value identified at block 605 is within the speed constraints of the second dependent component. If not, the process 600 may continue at block 630. If, however, the maximum speed value identified at block 605 is within the speed constraints of the second dependent component, the process 600 may continue at block 635.

At block 630, the control processor 125 may select a new maximum speed value. For instance, the control processor 125 may choose another speed value defined by the independent speed constraints as the new maximum speed value. The process 600 may continue at block 610 with the new maximum speed value.

At block 635, the control processor 125 may select another value based on the intersections of the speed constraints of the first and second dependent components. Alternatively, the control processor 125 may select another value based on the intersections of the speed constraints of either the first or second dependent components and the speed constraints of the independent components. The control processor 125 may select the intersection with the largest value when trying to determine the maximum speed value of the unknown speed constraint. The process 600 may continue with this new value at block 640.

At block 640, the control processor 125 may determine whether the new maximum speed value (e.g., based on the intersection between the speed constraints of either the first or second dependent components and the speed constraints of the independent components) satisfies the other speed constraints. For instance, if the new maximum speed value determined at block 635 is based on the intersection between the speed constraints of the first and second dependent components, the control processor 125 may determine whether this new value satisfies the speed constraints of the independent components at block 640. If, however, the new maximum speed value determined at block 635 is based on the intersection between the speed constraints of the first dependent component and the independent component, at block 640, the control processor 125 may determine whether the maximum speed value satisfies the speed constraints of the second dependent component. If all speed constraints are satisfied, the process 600 may continue at block 620. If not all speed constraints are satisfied, the process 600 may continue at block 635, except that the control processor 125 may select the intersection with the next highest speed value as the new maximum speed value.

Figure 7:
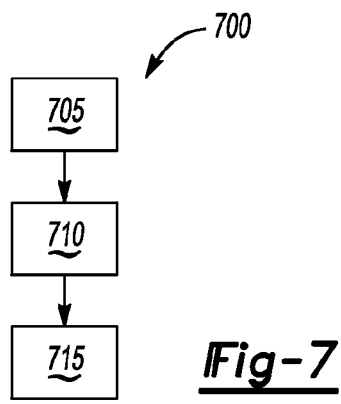
FIG. 7 illustrates a flowchart of a process of determining a minimum and maximum speed value in an unknown speed constraint that may be implemented by the control processor of FIG. 2.

FIG. 7 illustrates an example process 700 of deriving speed values of the unknown speed constraint of the third dependent vehicle component based on the speed constraints of the independent and dependent vehicle components. In particular, the system 100 may use the process 700 to identify a minimum speed value and a maximum speed value of the unknown speed constraints of the third dependent component.

At block 705, the control processor 125 may identify the smallest speed value within the speed constraints of the independent components and the first and second dependent components as the minimum speed value of the unknown speed constraint.

At block 710, the control processor 125 may identify the largest speed value within the speed constraints of the independent components and first and second dependent components as the maximum speed value of the unknown speed constraint.

At block 715, the control processor 125 may define the unknown speed constraints to include the minimum speed value determined at block 705 and the maximum speed value determined at block 710. For example, the control processor 125 may use the calibration parameters of the dependent component associated with the unknown speed constraints to determine a slope of the unknown speed constraints relative to the speed constraints of the independent components. The control processor 125 may geometrically define the unknown speed constraint to be two parallel lines, each having the slope defined by the calibration parameters. However, one line (e.g., the minimum speed constraint) may pass through the minimum speed value determined at block 705, while the other line (e.g., the maximum speed constraint) may pass through the maximum speed value determined at block 710.

While the best modes for carrying out the invention have been described in detail, those familiar with the art to which this invention relates will recognize various alternative designs and embodiments for practicing the invention within the scope of the appended claims.

The invention claimed is:

1. A method comprising:
   receiving speed constraints associated with two independent vehicle components;
   receiving speed constraints associated with a first dependent vehicle component;
   receiving speed constraints associated with a second dependent vehicle component;
   defining a relationship between the received speed constraints of the independent vehicle components and the first and second dependent vehicle components; and
   deriving, via a computing device, speed values of an unknown speed constraint associated with a third dependent component based on the defined relationship between the received speed constraints of the independent vehicle components and the first and second dependent vehicle components.

2. A method as set forth in claim 1, wherein deriving the speed values within the unknown speed constraints includes identifying a minimum speed value and a maximum speed value of at least one of the independent vehicle components.

3. A method as set forth in claim 2, wherein deriving the speed values within the unknown speed constraints includes identifying a speed value common to the first dependent vehicle component and the second dependent vehicle component, wherein the common speed value includes a speed value within the speed constraints associated with the first and second dependent vehicle components.

4. A method as set forth in claim 3, wherein deriving the speed values within the unknown speed constraints includes determining whether the common speed value is within the speed constraints of the independent component.

5. A method as set forth in claim 4, further comprising determining that the common speed value is included in the unknown speed constraints if the common speed value is within the speed constraints of the independent vehicle components.

6. A method as set forth in claim 5, further comprising determining that the common speed value is excluded from the unknown speed constraints if the common speed value is outside the speed constraints of the independent vehicle components.

7. A method as set forth in claim 1, wherein deriving the speed values within the unknown speed constraints includes identifying a minimum speed value and a maximum speed value of the third dependent component.

8. A method as set forth in claim 7, wherein identifying the minimum speed value includes identifying a smallest speed value within the speed constraints of the independent component and the speed constraints of the first and second dependent components.

9. A method as set forth in claim 8, wherein identifying the maximum speed value includes identifying a largest speed value within the speed constraints of the first independent component and the speed constraints of the first and second dependent components.

10. A method as set forth in claim 1, wherein at least one of the independent components includes a motor.

11. A vehicle comprising:
a plurality of independent vehicle components configured to rotate;
a first dependent vehicle component operably connected to at least one of the independent vehicle components and configured to rotate at a speed dependent upon the rotation of at least one of the independent vehicle components;
a second dependent vehicle component operably connected to at least one of the independent vehicle components and configured to rotate at a speed dependent upon the rotation of at least one of the independent vehicle components;
wherein the independent vehicle components, the first dependent vehicle component, and the second dependent vehicle component are each associated with a speed constraint;
a third dependent vehicle component operably connected to the independent vehicle component and configured to rotate at a speed dependent upon the rotation of at least one of the independent vehicle components, wherein the third dependent vehicle component is associated with an unknown speed constraint; and
a control processor configured to define a relationship between the speed constraints of the independent vehicle components, the first dependent vehicle component, and the second dependent vehicle component, and derive speed values within the unknown speed constraint of the third dependent vehicle component based on the derived relationship between the speed constraints of the independent vehicle components and the first and second dependent vehicle components.

12. A vehicle as set forth in claim 11, wherein the control processor is configured to identify a minimum and maximum speed value of the speed constraint associated with at least one of the independent vehicle components.

13. A vehicle as set forth in claim 12, wherein the control processor is configured to identify a speed value common to the speed constraints associated with the first and second dependent vehicle components.

14. A vehicle as set forth in claim 13, wherein the control processor is configured to determine whether the common speed value is within the speed constraint associated with the independent vehicle components.

15. A vehicle as set forth in claim 14, wherein the control processor is configured to determine that the unknown speed constraints includes the common speed value if the common speed value is within the speed constraint associated with the independent vehicle components.

16. A vehicle as set forth in claim 15, wherein the control processor is configured to determine that the unknown speed constraint excludes the common speed value if the common speed value is outside the speed constraints associated with the independent vehicle components.

17. A vehicle as set forth in claim 11, wherein the control processor is configured to identify a minimum speed value and a maximum speed value of the unknown speed constraint.

18. A vehicle as set forth in claim 17, wherein the control processor is configured to identify a smallest speed value within the speed constraints associated with the independent vehicle components and the first and second dependent vehicle components as the minimum speed value in the unknown speed constraint.

19. A vehicle as set forth in claim 17, wherein the control processor is configured to identify a largest speed value within the speed constraints associated with the independent vehicle components and the first and second dependent vehicle components as the maximum speed value in the unknown speed constraint.

20. A vehicle as set forth in claim 11, wherein at least one of the independent vehicle components includes a motor.

* * * * *